E. J. HERCHERT.
CHAIN.
APPLICATION FILED JAN. 7, 1908.

924,551.

Patented June 8, 1909.

Edwin J. Herchert, Inventor

Witnesses

Attorney

UNITED STATES PATENT OFFICE.

EDWIN J. HERCHERT, OF EAST ELKPORT, IOWA.

CHAIN.

No. 924,551.      Specification of Letters Patent.      Patented June 8, 1909.

Application filed January 7, 1908. Serial No. 409,663.

*To all whom it may concern:*

Be it known that I, EDWIN J. HERCHERT, a citizen of the United States, residing at East Elkport, in the county of Clayton and State of Iowa, have invented a new and useful Chain, of which the following is a specification.

This invention relates more particularly to sprocket chains, and the primary object is to provide a novel, simple, cheap and effective structure, which can be readily manufactured and assembled, is not apt to break, has protected bearings, and is very durable.

The preferred form of construction is illustrated in the accompanying drawings, wherein:—

Figure 1:
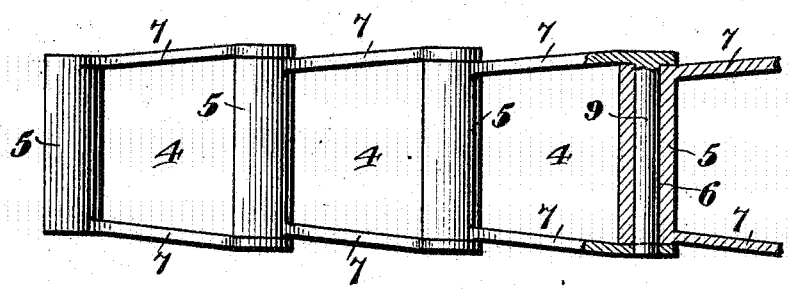
Figure 2:
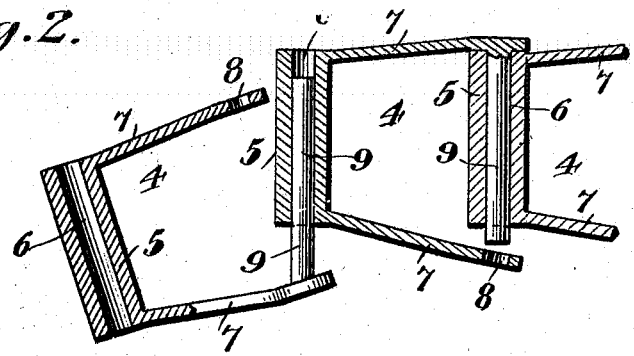
Figure 3:
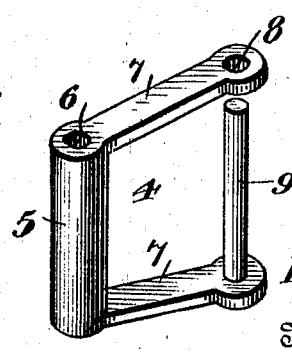

Figure 1 is a plan view of a portion of a chain, part thereof being shown in section. Fig. 2 is a sectional view showing the manner in which the links are constructed and assembled. Fig. 3 is a perspective view of one of the links.

Similar reference numerals designate corresponding parts in all the figures of the drawings.

The chain comprises a series of links 4, and each link is preferably made of a single piece of metal. Said link comprises a transversely disposed continuous end sleeve 5 provided with a bore 6, and having integral arms 7 projecting from the ends thereof and of less width than the diameter of the sleeve. The free end of one of the arms is provided with an enlarged ear having a flat inner side and a central opening 8. The corresponding end of the other arm also has an enlarged ear provided with a flat inner side, from the center of which projects an integral transverse pivot 9 that is somewhat longer than the sleeve 6 and is straight from end to end. The free end of said pivot 9 is sufficiently small to pass through the opening 8. It will be noted particularly by reference to the sectioned portion of Fig. 1 that inasmuch as the terminal ears are of greater diameter than the pivot 9, they form stop flanges completely about the ends of said pivot and act as abutments for the ends of the sleeve of the link placed on the pivot, besides more effectively protecting the bearing against the ingress of dirt and dust.

The arms 7 are bendable, and the links may be constructed of any suitable material that will permit the bending of said arms. For instance, they may be wrought or malleable iron or steel. When constructed, the arm carrying the pivot, is distorted so that the free end of the said pivot is disposed in spaced relation to the end of the arm having the opening 8, as illustrated in Figs. 2 and 3. The links therefore can be readily assembled into a chain by passing the pivot 9 of one link through the bore 6 of the sleeve of the adjacent link, after which the parts are bent, and the free end of the pivot 9 is passed through the opening 8 and upset therein against detachment. Preferably the pivots of the alternate links are passed through the sleeves in opposite directions, as illustrated in Fig. 2. It will be evident that these links can be cheaply manufactured and readily assembled into a chain. Furthermore the pivot bearings being entirely surrounded by the sleeves, are protected to a very material degree against the entrance of dirt and dust, and wear is consequently reduced, thus eliminating a serious objection to that type of chains wherein hooks are employed having open slots through which dust can enter the link bearings. It will be evident that the chain when assembled can be used in the manner of an ordinary sprocket chain, and can be operated in either direction without difficulty.

From the foregoing, it is thought that the construction, operation, and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is:—

As an article of manufacture, a chain link formed of a single piece of metal comprising a transversely disposed continuous end sleeve, bendable arms of less width than the diameter of the sleeve, each arm having one end integral with one end of said sleeve, one of said arms having an enlarged integral ear at its free end provided with a central opening and a flat inner face surrounding the opening, the other arm also having an enlarged integral ear at its free end provided with a flat inner face, and a transverse pivot, straight from end to end, projecting from the center of the latter ear, said pivot being of less diameter than the ear and being integral therewith, the free end of the pivot being movable into the opening of the first mentioned ear when the arms are bent toward each other and said ears forming stop flanges completely around the ends of the pivot, thereby forming abutments for the end of the sleeve of a link placed upon the pivot.

In testimony, that I claim the foregoing as my own, I have hereto affixed my signature in the presence of two witnesses.

EDWIN J. HERCHERT.

Witnesses:
    THEO. SIEGE,
    HENRY C. SCHNEPF.